United States Patent
Mandal et al.

(10) Patent No.: US 11,466,126 B2
(45) Date of Patent: Oct. 11, 2022

(54) CONDENSATION CURABLE COMPOSITION COMPRISING SILOXANE-IMIDE BASE POLYMER

(71) Applicant: Momentive Performance Materials Inc., Waterford, NY (US)

(72) Inventors: Subrata Mandal, Bangalore (IN); Tetsuo Fujimoto, Gunma (JP); Debanga B. Konwar, Bangalore (IN)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 17/132,350

(22) Filed: Dec. 23, 2020

(65) Prior Publication Data

US 2022/0195125 A1   Jun. 23, 2022

(51) Int. Cl.
| | |
|---|---|
| *C08G 77/455* | (2006.01) |
| *C08G 77/08* | (2006.01) |
| *C08G 77/16* | (2006.01) |
| *C08K 5/5419* | (2006.01) |
| *C08G 77/00* | (2006.01) |
| *C08K 3/22* | (2006.01) |

(52) U.S. Cl.
CPC .......... *C08G 77/455* (2013.01); *C08G 77/08* (2013.01); *C08G 77/16* (2013.01); *C08G 77/70* (2013.01); *C08G 77/80* (2013.01); *C08K 3/22* (2013.01); *C08K 5/5419* (2013.01); *C08G 2150/00* (2013.01); *C08G 2170/00* (2013.01); *C08K 2003/2272* (2013.01)

(58) Field of Classification Search
CPC .............................. C08G 77/455; C08L 83/08
See application file for complete search history.

(56) References Cited

U.S. PATENT DOCUMENTS

| | | | | |
|---|---|---|---|---|
| 4,472,565 | A | * | 9/1984 | Ryang ................. C07D 209/76 |
| | | | | 525/431 |
| 4,634,610 | A | | 1/1987 | Keohan et al. |
| 5,009,934 | A | | 4/1991 | Wenski et al. |
| 6,451,381 | B2 | | 9/2002 | Nakamura et al. |
| 8,071,693 | B2 | | 12/2011 | Banerjee et al. |
| 2003/0004268 | A1 | | 1/2003 | Sundararaj et al. |
| 2004/0110014 | A1 | * | 6/2004 | Chen ..................... C09D 179/08 |
| | | | | 428/447 |
| 2013/0237040 | A1 | * | 9/2013 | Kakuta ....................... C08J 3/24 |
| | | | | 438/479 |

FOREIGN PATENT DOCUMENTS

| | | | |
|---|---|---|---|
| EP | 693517 | * | 1/1996 |
| GB | 2143246 | | 7/1987 |
| JP | 03097849 | | 10/1991 |
| JP | 4803371 | | 10/2011 |
| KR | 1020140073363 | | 6/2014 |

OTHER PUBLICATIONS

Orzeszko et al., "Synthesis of novel silicon-modified polymides." Polymer Bulletin. vol. 48, 2002, pp. 431-438.
Siltem Resin-An Introduction, Chemistry that Matters. https://www.sabic.com/en/products/specialties/siltem-resins.
Patent Cooperation Treaty (PCT), International Search Report and Written Opinion for Application PCT/US2021/060425 filed Nov. 23, 2021, dated Mar. 14, 2022, International Searching Authority, EP.

* cited by examiner

*Primary Examiner* — Margaret G Moore
(74) *Attorney, Agent, or Firm* — Joseph Waters; McDonald Hopkins LLC

(57) ABSTRACT

A condensation curable silicone adhesive composition comprising a siloxane-imide base polymer, condensation curable organopolysiloxane crosslinker, a condensation catalyst and an additive is shown and described herein. The composition is curable at relatively room temperatures and shows good heat stability.

23 Claims, No Drawings

CONDENSATION CURABLE COMPOSITION COMPRISING SILOXANE-IMIDE BASE POLYMER

FIELD OF INVENTION

The present invention relates to a condensation curable composition. In particular, the present invention relates to a curable composition comprising a comprising siloxane-imide base polymer, a crosslinker, a catalyst and optionally other additives. The composition may be curable at room temperatures in less than 24 hours, and the cured material may exhibit stability to extreme temperature conditions (e.g., even at temperatures of 350° C. or greater) for use in a variety of applications.

BACKGROUND

High heat stable materials, e.g., materials that are stable at temperatures of about 350° C. or greater, are desirable for a wide range of applications. Additionally, many applications not only require stability at high temperatures, but the material may be required to retain or substantially sustain its mechanical properties and flexibility over a wide range of temperatures from extreme cold (e.g., below 0° C. to −100° C.) to high heat exposure (e.g., about 350° C. or greater). Many current curable silicone-based materials are generally only stable up to 275° C. only.

Current curable silicone-based materials used in the aerospace industry retain elastomeric properties from −115° C. (−175° F.) up to 260° C. (500° F.) continuously, and may retain elastomeric properties even up to 316° C. (600° F.) for short periods of time. Organic polymers like polyimide and polybenzimidazole can be stable at more than 400° C., but these materials have their own processability and flexibility issues, which makes them difficult to use for some applications. Considering their characteristic individual limitations (heat stability and flexibility), pure silicone or pure organic polymer like polyimide cannot be used alone for this wide temperature application.

Siloxane modified polyimide materials are known in art. These materials are self-standing membrane type flexible materials with high heat stability and high thermal conductive properties. These materials, however, have some processability issues that limit their ability to be used in large-scale applications.

Recent attempts to improve heat stability have included the use of a mold making composition comprising copolymer of siloxane modified polyimide or siloxane—polyether-imide block copolymer (see, e.g., U.S. Pat. No. 8,071,693, U.S. Publication 2003/0004268, and U.S. Pat. No. 6,451,381). Other attempts are described in, for example, Japan Patents 3279635 and 4803371 related to non-curable siloxane imide copolymers and Korean publication 10-2014-007363 related to a composite sheet comprising a siloxane imide copolymer with reinforcing material. These proposed solutions, however, do not address the high heat stable material more than 350° C.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Provided is a condensation curable silicone-imide composition which has been found to cure at room temperature within 24 hours, without presence of any solvent and a cured material comprising this composition which shows heat stability superior to that of pure siloxane.

In one aspect, provided is a condensation curable composition comprising: (a) silicone-imide base polymer; (b) a crosslinker; (c) a condensation cure catalyst; and (d) optionally, an additive.

In one embodiment, the silicone-imide base polymer (a) is selected from a compound of the formula (I):

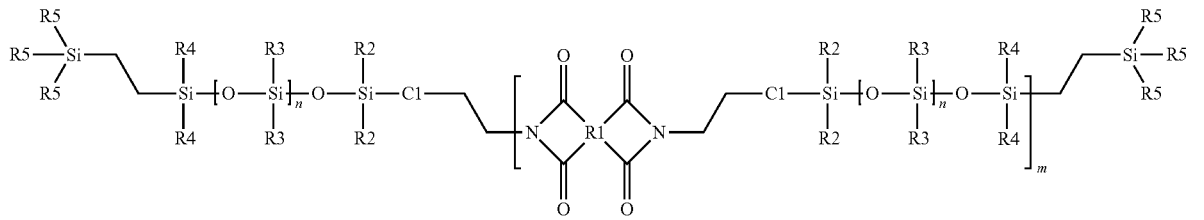

wherein $R^1$ is chosen from a C5-C20 aryl, a polycyclic aryl group comprising two or more C5-C20 aryl groups, where $R^1$ can be unsubstituted or substituted with a C1-C6 alkyl, a halogen, a haloalkyl, a hydroxy, and/or a C1-C5 alkoxy groups;

$C^1$ can be chosen from C1 to C5 alkyl, a C5-C20 aryl, a C7-C16 arylalkyl, or a C7-C16 alkylaryl;

$R^2$, $R^3$, and $R^4$ may be same or different and can be chosen from a C1-C3 alkyl or phenyl;

$R^5$ may be same or different and can be chosen from C1-C30 alkyl, a C1-C30 alkoxy group, a C1-C30 acetoxy group, or a C1-C30 ketoxime group;

m is an integer between 1 and 30; and
n is an integer between 1 and 200.

In one embodiment, $R^1$ is selected from benzene, naphthalene, benzophenone, biphenyl, a biphenyl alkane, biphenylether, isopropylidinediphenylphenoxy, biphenyl sulfone, biphenyl sulfide, norbornyl and hexafluoromethylbiphenyl. In on embodiment, $R^1$ is benzene.

In one embodiment of the curable silicone composition of any previous embodiment, the silicone-imide base polymer (a) is present in an amount of from about 20 parts to about 100 parts, from about 40 weight % to about 95 weight %, or from about 50 weight % to about 91 weight % based on the total parts by weight of the curable silicone composition.

In one embodiment, crosslinker (b) is selected from alkoxysilane, alkoxysilicate, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkarylaminosiloxane, an alkoxycarbamatosilane, an alkoxycarbamatosiloxane, and combinations of two or more thereof.

In one embodiment of the curable silicone composition of any previous embodiment, the crosslinker (b) is selected from tetraethylorthosilicate (TEOS), methyltrimethoxysilane (MTMS), or a combination thereof.

In one embodiment of the curable silicone composition of any previous embodiment, the crosslinker (b) is present in an amount of from about 0.5 parts to about 50 parts, from about 1 part to about 30 parts, or from about 5 parts to about 10 parts based on the total parts by weight of the curable silicone composition.

In one embodiment of the curable silicone composition of any previous embodiment, the catalyst (c) is selected from tin catalysts like dibutyltin dilaurate (DBTDL) or dioctyl tin compounds, metal or organometal catalysts comprising metals such as Ca, Ce, Bi, Fe, Mo, Mn, Pb, Ti, V, Zn and Y and non-tin catalysts comprising a combination of a carboxylic acid component, an amino containing silane or a mixture of amino-containing silanes, and optionally an amino containing siloxane component.

In one embodiment of the curable silicone composition of any previous embodiment, the organometal catalyst is dibutyltin dilaurate.

In one embodiment of the curable silicone composition of any previous embodiment, the catalyst (c) in an amount of from about 0.01 parts to about 5 parts, from about 0.2 parts to about 1 parts, or from about 0.01 parts to about 0.03 parts based on the total parts by weight of the curable silicone composition.

In one embodiment of the curable silicone composition of any previous embodiment, the additive (d) is selected from a filler, a pigment, a lubricant, a viscosity modifier, an antioxidant, a photostabilizer, a heat stabilizer, a flame retardant, an inhibitor, an adhesion promoter, or a combination of two or more thereof.

In one embodiment of the curable silicone composition of any previous embodiment, the additive is a filler.

In one embodiment of the curable silicone composition of any previous embodiment, the filler is selected from SiO2, TiO2, MgO, ZnO, $CaCO_3$, $CeO_2$, $Fe_2O_3$, SiC, Clay Material, Graphene Oxide, Boron Oxide, BN, Carbon Nano Tube, Zirconium Oxide, Fly Ash, $Zr(OEt)_4$, $Ti(OEt)_4$, powder form of any Polyimide, Polybenzimidazole, Polyamideimide, Poly BPA Sulfone, Siloxane-Polyimide, Siloxane-Benzimidazole, Siloxane-Polysulfones or any other heat stable filler.

In one embodiment of the curable silicone composition of any previous embodiment, the filler in an amount of from about 0 parts to about 50 parts, from about 15 parts to about 40 parts, or from about 25 parts to about 30 parts by weight based on the total weight of the curable silicone composition.

In one embodiment of the curable silicone composition of any previous embodiment, the filler is $Fe_2O_3$.

In one embodiment, a silicone-imide composition in accordance with any of the previous embodiments is coated or adhered on a substrate.

In one embodiment, the substrate is chosen from a plastic material, ceramic, glass, rubber material, filled metal, metal alloys, metallized plastic, and/or coated or painted metal.

In one embodiment, a cured silicone-imide material is formed from the composition.

In one embodiment, there is provided a cured silicone-imide material formed from the composition having a thermal degradation of 400° C. to 600° C. as measured by thermogravimetric analysis.

In another embodiment, the cured silicone-imide material formed from the composition is used in aerospace, electronics, automobiles, insulations, coatings, and solvent resistant membranes applications.

The following description and the drawings disclose various illustrative aspects. Some improvements and novel aspects may be expressly identified, while others may be apparent from the description and drawings.

DETAILED DESCRIPTION

Reference will now be made to exemplary embodiments, examples of which are illustrated in the accompanying drawings. It is to be understood that other embodiments may be utilized, and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The disclosure may identify a number of different ranges for a component or components in the composition. It will be appreciated that the numerical values of the respective ranges can be combined to form new and non-specified ranges.

The term "alkyl" includes straight, branched, and cyclic monovalent hydrocarbon groups, which may be substituted with a heteroatom or heteroatom containing group. In embodiments, the term alkyl may include C1-C30 alkyl groups. Examples of suitable alkyl groups include, but are not limited to, methyl, ethyl, propyl, isopropyl, butyl, isobutyl, tertbutyl, pentyl, hexyl, heptyl, octyl, nonyl, decyl, etc.

The term "alkylene" includes straight, branched, and cyclic divalent hydrocarbon groups, which may be substituted with a heteroatom or heteroatom containing group. In embodiments, the term alkylene includes C1-C30 alkylene groups. Examples of alkylenes include, but are not limited to, methylene, ethylene, propylene, isopropylene, butylene, isobutylene, tertbutylene, pentylene, hexylene, heptylene, octylene, nonylene, decylene, etc.

The term "aryl" includes any monovalent aromatic hydrocarbon group, which may be substituted with a heteroatom or heteroatom containing group. This term also includes fused systems containing an aromatic group and groups with multiple aryl groups joined by a bond or linker group. In embodiments the term aryl include C5-C20 aryl groups, fused aryl groups comprising two or more C5-C20 aryl groups, and multi-aryl group structures comprising two or more C5-C20 aryl groups joined by a linker group.

The term "arylene" includes any divalent aromatic hydrocarbon group, which may be substituted with a heteroatom or heteroatom containing group this term also includes fused systems containing an aromatic group. In embodiments the term aryl include C5-C20 arylene groups, fused arylene groups comprising two or more C5-C20 aryl groups, and multi-arylene group structures comprising two or more C5-C20 aryl groups joined by a linker group.

The term "aralkyl" include straight, branched, and cyclic monovalent hydrocarbon groups substituted with an aryl substituent.

The term "cyclo" or "cyclic" alkyl includes a monovalent cyclic hydrocarbon and includes, free cyclic groups, bicyclic groups, tricyclic groups, and higher cyclic structures, as well as bridged cyclic groups, fused cyclic groups, and fused cyclic groups containing at least one bridged cyclic group. In embodiments, a cyclic alkyl includes a C3-C20 cyclic alkyl group. Example of suitable cyclic groups include, but are not limited to, cyclopropyl, cyclopentyl, cyclohexyl, norbornyl, bicyclo[2.2.2]nonane, adamantyl, or tetrahydronaphthyl (tetralin).

The term "cyclo" or "cyclic" alkylene includes a divalent cyclic hydrocarbon and includes, free cyclic groups, bicyclic groups, tricyclic groups, and higher cyclic structures, as well as bridged cyclic groups, fused cyclic groups, and fused cyclic groups containing at least one bridged cyclic group. In embodiments, a cyclic alkylene includes a C3-C20 cyclic alkylene group.

The term "alkynyl" is defined as a C2-C10 branched or straight-chain unsaturated aliphatic hydrocarbon groups having one or more triple bonds between two or more carbon atoms. Examples of alkynes include ethynyl, propynyl, butynyl, pentynyl, hexynyl, heptynyl, octynyl and nonynyl.

The term "substituted" means that one or more hydrogens on the molecule, portion of the molecule, or atom are replaced by a substitution group provided that the normal valency is not exceeded. The substitution group can be a hetero atom. The term "hetero" as used herein refers to an atom or in conjunction with another group includes an atom or group containing an atom such as oxygen, nitrogen, sulfur, silicon, phosphorus, boron, etc. Examples of suitable substitution groups include, but are not limited to, —OR, —NR'R, —C(O)R, —SR, -halo, —CN, —NO$_2$, —SO$_2$, phosphoryl, imino, thioester, carbocyclic, aryl, heteroaryl, alkyl, alkenyl, bicyclic and tricyclic groups. When a substitution group is a keto (i.e., =O) group, then 2 hydrogens on the atom are replaced. Keto substituents are not present on aromatic moieties. The terms R and R' refer to alkyl groups that may be the same or different.

Provided is a condensation curable silicone-imide composition which has been found to cure at room temperature without presence of any solvent. The condensation curable composition comprises a siloxane-imide base polymer. Also provided is a cured material comprising or formed from the curable composition. The cured material exhibit excellent heat stability as evidenced, for example, by its decomposition peak (T$_d$) evaluated using thermogravimetric analysis. The heat stability of the cured material formed from the composition is superior to that of pure siloxane.

In one aspect, provided is a condensation curable composition comprising: (a) silicone-imide base polymer; (b) crosslinker; (c) condensation cure catalyst; and (d) optionally, an additive.

In one embodiment, the silicone-imide base polymer is selected from a compound of the formula (I):

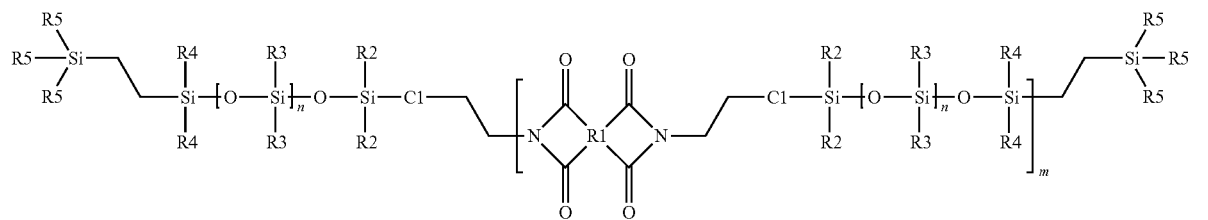

(I)

wherein $R^1$ is chosen from a C5-C20 aryl, a polycyclic aryl group comprising two or more C5-C20 aryl groups, where $R^1$ can be unsubstituted or substituted with a C1-C6 alkyl, a halogen, a haloalkyl, a hydroxy, and/or a C1-C5 alkoxy groups;

$C^1$ can be chosen from C1 to C5 alkyl, a C5-C20 aryl, a C7-C16 arylalkyl, or a C7-C16 alkylaryl;

$R^2$, $R^3$, and $R^4$ may be same or different and can be chosen from a C1-C3 alkyl or phenyl;

$R^5$ may be same or different and can be chosen from C1-C30 alkyl, a C1-C30 alkoxy group, a C1-C30 acetoxy group, or a C1-C30 ketoxime group;

m is an integer between 1 and 30; and n is an integer between 1 and 200.

$R^1$ is selected from a C5-C20 aryl, or polycyclic aryl comprising two or more C5-C20 aryl groups. The polycyclic aryl groups can be a fused ring or an unfused system joined by a linker group. Examples of suitable aryl and/or polycyclic aryl groups for $R^1$ include, but are not limited to, benzene, naphthalene, benzophenone, biphenyl, a biphenyl alkane (e.g., a biphenyl group with an alkyl linker chosen from a C1-C20 alkyl such as, but not limited to, biphenyl methane, biphenyl ethane, biphenyl propane, biphenyl isopropane, biphenyl butane, biphenyl isobutene, biphenyl tertbutane, biphenyl hexane, biphenyl octane, etc.) biphenylether, isopropylidinediphenylphenoxy, biphenyl sulfone, biphenylsulfide, norbornyl and hexafluoromethylbiphenyl, etc. In one embodiment, $R^1$ is benzene.

$R^2$, $R^3$, and $R^4$ may be same or different and can be chosen from a C1 to C3 alkyl or phenyl. In one embodiment $R^2$, $R^3$, and $R^4$ are each methyl. In one embodiment, $R^2$ and $R^4$ are each a C1-C3 alkyl group and $R^3$ is phenyl.

R[5] may be same or different and can be chosen from C1-C30 alkyl, a C1-C30 alkoxy group, a C1-C30 acetoxy group, or a C1-C30 ketoxime group. In embodiments, each R[5] is independently selected from a C1-C10 alkyl, a C2-C8 alkyl, or a C4-C6 alkyl. In one embodiment, each R[5] is methyl.

The variable m can be 1-30, 2-25, 5-20, 6-15, or 8-10. In one embodiment, m is 1.

The variable n can be 1-200, 5-150, 10-125, 25-100, or 50-75.

The crosslinker (b) may be selected as desired for a particular purpose or intended application. The crosslinker (b) is generally selected from a silicone based material. Examples of materials suitable as the crosslinker (b) include, but are not limited to, an alkoxysilane, an alkoxysilicate, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkarylaminosiloxane, an alkoxycarbamatosilane, an alkoxycarbamatosiloxane, and combinations of two or more thereof.

Examples of suitable cross-linkers include, but are not limited to, tetraethylorthosilicate (TEOS); methyltrimethoxysilane (MTMS); methyltriethoxysilane; vinyltrimethoxysilane; vinyltriethoxysilane; methylphenyldimethoxysilane; 3,3,3-trifluoropropyltrimethoxysilane; methyltriacetoxysilane; vinyltriacetoxysilane; ethyltriacetoxysilane; di-butoxydiacetoxysilane; phenyltripropionoxysilane; methyltris(methylethylketoxime)silane; vinyltris(methylethylketoxime)silane; 3,3,3-trifluoropropyltris(methylethylketoxime)silane; methyltris(isopropenoxy)silane; vinyltris(isopropenoxy)silane; ethylpolysilicate; dimethyltetraacetoxydisiloxane; tetra-n-propylorthosilicate; methyldimethoxy(ethylmethylketoximo)silane; methylmethoxybis-(ethylmethylketoximo)silane; methyldimethoxy(acetaldoximo)silane; methyldimethoxy(N-methylcarbamato)silane; ethyldimethoxy(N-methylcarbamato)silane; methyldimethoxyisopropenoxysilane; trimethoxyisopropenoxysilane; methyltri-isopropenoxysilane; methyldimethoxy(but-2-ene-2-oxy)silane; methyldimethoxy(1-phenyl ethenoxy)silane; methyldimethoxy-2 (1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxyethylaminosilane; dimethyldi-N,N-dimethylaminosilane; methyldimethoxyisopropylaminosilane dimethyldi-N,N-diethylaminosilane. ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido)silane; methylmethoxybis(N-methylacetamido)silane; methyldimethoxy(caprolactamo)silane; trimethoxy(N-methylacetamido)silane; methyldimethoxyethylacetimidatosilane; methyldimethoxypropylacetimidatosilane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxythioisocyanatosilane; methylmethoxydithioisocyanatosilane, or combinations of two or more thereof.

A condensation cure catalyst (c) may be used to promote the reaction of the condensation curable organopolysiloxane with the siloxane-imide crosslinker. The condensation cure catalyst is not particularly limited and can be selected from any suitable catalyst material for promoting condensation curing reactions. Examples of suitable metal catalysts or organometal catalysts include, but are not limited to, those which use metal such as tin, titanium, zinc and calcium, and complexes of these metals. Examples of suitable condensation catalysts for use in the present invention include, but are not limited to, tin catalysts such as dibutyltin dilaurate (DBTDL) or dioctyl tin compounds, metal or organometal catalysts comprising metals such as Ca, Ce, Bi, Fe, Mo, Mn, Pb, Ti, V, Zn and Y and non-tin catalysts comprising a combination of a carboxylic acid component, an amino containing silane, or a mixture of amino-containing silanes, and optionally an amino containing siloxane component.

The carboxylic acid component of the catalyst may be chosen from any suitable carboxylic acid component. In one embodiment, the carboxylic acid component may be chosen from an aliphatic carboxylic acid. Suitable carboxylic acids for the carboxylic acid component include, but are not limited to, a branched alkyl C4-C30-alkyl carboxylic acid, including C5-C30, even C5-C19 acids with alpha tertiary carbon, or a combination of two or more thereof. Some useful carboxylic acids that can be utilized herein include, but are not limited to, propanoic acid, 2-methyl propanoic acid, butanoic acid, pentanoic acid (valeric acid), hexanoic acid (caproic acid), 2-ethylhexanoic acid, heptanoic acid (enanthic acid), hexanoic acid, octanoic acid (caprylic acid), oleic acid, linoleic acid, linolenic acid, cyclohexanecarboxylic acid, cyclohexylacetic acid, cyclohexenecarboxylic acid, benzoic acid, benzeneacetic acid, propanedioic acid (malonic acid), butanedioic acid (succinic acid), hexanedioic acid (adipic acid), 2-butenedioic acid (maleic acid), lauric acid, stearic acid, myristic acid, palmitic acid, isoanoic acid, Versatic™ Acid (available from Momentive), etc., or a combination of two or more thereof.

In one embodiment, the organometal catalyst is dibutyltin dilaurate.

The additive (d) can be chosen from a number of additives and is selected as desired for a particular purpose or intended application. The additive may be selected to impart certain properties to the cured material formed from the composition, to help in processing the composition, etc. In one embodiment, the additive (d) is selected from a pigment, a lubricant, a viscosity modifier, a heat stabilizer, a photostabilizer, a flame retardant, an inhibitors, an adhesion promoters or a combinations of two or more thereof.

In one embodiment, the additive (d) is present in an amount of from about 0.05 parts by mass to about 3000 parts, from about 0.5 parts to about 1000 parts, or from about 0.05 parts to about 1 parts based on the total weight of the curable silicone composition. In one embodiment, the additive is present in an amount from about 0 parts to about 50 parts, more preferably from about 10 parts to about 40 parts, and most preferably from about 25 parts to about 30 parts by weight based on the total weight of the curable silicone composition.

In one embodiment, the additive is selected from an inhibitor. In one embodiment, the inhibitor is selected from ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated or isolated ene-ynes, hydroperoxides, ketones, sulfoxides, amine, phosphines, phosphites, nitrites, diaziridines, etc. Particularly suitable inhibitors for the compositions are alkynyl alcohols and maleates. Examples of suitable polymerization inhibitors include, but are not limited to, diallyl maleate, hydroquinone, p-methoxyphenol, t-butylcatechol, and phenothiazine.

In one embodiment, the inhibitor is present in an amount of from about 1 parts by mass to about 10 parts, more preferably from about 0.1 parts to about 2 parts, and most preferably from about 0.05 parts to about 1 part based on the total weight of the curable silicone-imide composition.

In one embodiment, the additive (d) is selected from a polymerization inhibitor. The polymerization inhibitor is not particularly limited and may be chosen as desired for a particular purpose or intended use. Examples of suitable inhibitors include, but are not limited to, ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated or isolated ene-ynes, hydroperoxides, ketones, sulfoxides, amine, phosphines, phosphites, nitrites, diaziridines, etc. Particularly suitable inhibitors for the compositions are alkynyl alcohols and maleates. Examples of suitable polymerization inhibitors include, but are not limited to, diallyl maleate, hydroquinone, p-methoxyphenol, t-butylcatechol, phenothiazine, etc.

The amount of inhibitor to be used in the compositions can be any amount that will retard the above reaction at room temperature while not preventing said reaction at moderately elevated temperature. In embodiments, a polymerization inhibitor can be present in an amount of from about 0.05 part by mass to about 10 parts by mass, from about 0.1 parts by mass to about 5 parts by mass, or from about 1 part by mass to about 2 parts by mass.

The curable compositions may also include an antioxidant compound. Examples of suitable classes of antioxidant compounds include, but are not limited to, hindered amines and/or hindered phenol compounds.

Examples of hindered amine antioxidant compounds include, but are not limited to Hindered amine series antioxidant (N,N',N'',N'''-tetrakis-(4,6-bis(butyl-(N-methy)-2,2,6,6-tetramethylpiperidin-4-yl)amino)-triazine-2-yl)-4,7-diazadecan-1,10-diamine, a polycondensation product of dibutylamine-1,3,5-triazine-N,N'-bis-(2,2,6,6-tetramethyl-4-piperidyl-1,6-hexamethylenediamine-N-(2,2,6,6-tetramethyl-4-piperidyl)butylamine, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], a polymer of dimethyl succinate and 4-hydroxy-2,2,6,6-tetramethyl-1-piperidinethanol, [a reaction product of decanedioic acid bis(2,2,6,6-tetramethyl-1 (octyloxy)-4-piperidyl) ester, 1,1-dimethylethylhydroperoxide and octane] (70%)-polypropylene (30%), bis(1,2,2,6,6-pentamethyl-4-piperidyl)[[3,5-bis(1,1-dimethylethyl)-4-hydroxyphenyl]methyl]butylmalonate, methyl 1,2,2,6,6-pentamethyl-4-piperidylsebacate, bis(2,2,6,6-tetramethyl-4-piperidyl)sebacate, bis(1,2,2,6,6-pentamethyl-4-piperidyl) sebacate, 1-[2-[3-(3,5-di-tert-butyl-4-hydroxyphenyl)propionyloxy]ethyl]-4-[3-(3,5-di-tert-butyl-4-hydroxyphenyl) propionyloxy]-2,2,6,6-tetramethylpiperidine, 4-benzoyloxy-2,2,6,6-tetramethylpiperidine, 8-acetyl-3-dodecyl-7,7,9,9-tetramethyl-1,3,8-triazaspiro[4.5]decan-2,4-dione, etc.).

In one embodiment, the antioxidant compound is a hindered phenolic compound. The hindered phenol can be chosen as desired for a particular purpose or intended application. Examples of suitable hindered phenols include, but are not limited to, monophenols such as 2,6-di-t-butyl-p-cresol, 2-t-butyl-4-methoxyphenol, 3-t-butyl-4-methoxyphenol, and 2,6-t-butyl-4-ethylphenol, bisphenols such as 2,2'-methylene-bis(4-methyl-6-t-butylphenol), 4,4'-thiobis (3-methyl-6-t-butylphenol), and 4,4'-butylidene-bis(3-methyl-6-t-butylphenol); and polymeric phenols such as 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis[methylene-3-(3',5'-di-t-butyl-4'-hydroxyphenyl)propionate]methane, bis[3,3'-bis(4'-hydroxy-3-t-butylphenyl)butyric acid glycol ester, and tocopherol (vitamin E), pentaerythritol-tetrakis[3-(3,5-di-tert-butyl-4-hydroxyphenyl)propionate], thiodiethylene-bis[3-(3,5-di-tert-butyl-4-hydroxyphenyl)propionate], octadecyl-3-(3,5-di-tert-butyl-4-hydroxyphenyl)propionate), N,N'-hexane-1,6-diylbis[3-(3,5-di-tert-butyl-4-hydroxyphenylpropioamide), benzenepropanoic acid 3,5-bis(1,1-dimethylethyl)-4-hydroxy C7-C9 side chain alkyl ester, 2,4-dimethyl-6-(1-methylpentadecyl)phenol, diethyl[[3,5-bis(1,1-dimethylethyl)-4-hydroxyphenyl]methyl]phosphonate, 3,3',3'',5,5',5''-hexane-tert-butyl-4-a,a',a''-(mesitylene-2,4,6-tolyl)tri-p-cresol, calcium diethylbis[[[3,5-bis-(1,1-dimethylethyl)-4-hydroxyphenyl]methyl]phosphonate], 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6-(1H,3H,5H)-trione, a reaction product of N-phenylbenzeneamine and 2,4,4-trimethylpentene, 2,6-di-tert-butyl-4-(4,6-bis(octylthio)-1,3,5-triazine-2-ylamino)phenol etc.).

IRGANOX 1330 is a sterically hindered phenolic antioxidant ("3,3',3'',5,5',5''-hexa-tert-butyl-a,a',a'-(mesitylene-2,4,6-triyl)tri-p-cresol") commercially available from BASF. Irganox 1010 is a sterically hindered phenolic antioxidant ("Pentaerythritol Tetrakis(3-(3,5-di-tert-butyl-4-hydroxyphenyl)propionate)") commercially available from BASF, or 1,3,5-trimethyl-2,4,6-tris (3,5-di-tert-butyl-4-hydroxybenzyl) benzene commercially available as ETHANOX™ 330 (Albemarle Corporation), pentaerythritol tetrakis[3-(3,5-di-tert-butyl-4-hydroxyphenyl)propionate] (Irganox 1010), tris (3,5-di-tert-butyl-4-hydroxybenzyl) isocyanurate (Irganox 3114), tris(3,5-di-tert-butyl-4-hydroxybenzyl) isocyanurate as Irganox 3114.

Antioxidants can be included in the composition in an amount of from about 0 parts by mass to about 10 parts by mass, from about 0 parts by mass to about 5 parts by mass, or from about 0 parts by mass to about 3 parts by mass.

The curable composition may optionally comprise a photostabilizer. The photostabilizer is not particularly limited and may be chosen as desired for a particular application or intended use. Examples of suitable materials for the photostabilizer include, but are not limited to, 2,4-di-tert-butyl-6-(5-chlorobenzotriazol-2-yl)phenol, 2-(2H-benzotriazol-2-yl)-4,6-di-tert-pentylphenol, 2-(2H-benzotriazol-2-yl)-4-(1,1,3,3-tetramethylbutyl)phenol, a reaction product of methyl 3-(3-(21-1-benzotriazol-2-yl)-5-tert-butyl-4-hydroxyphenyl)propionate/polyethylene glycol 300, 2-(2H-benzotriazol-2-yl)-6-(straight and branched dodecyl)-4-methylphenol, 2-(4,6-diphenyl-1,3,5-triazine-2-yl)-5-[(hexyl)oxy]-phenol, octabenzone, 2,4-di-tert-butylphenyl-3,5-di-tert-butyl-4-hydroxybenzoate, tinuvin 622LD, Tinuvin 144, CHIMASSORB 119FL, MARK LA-57, LA-62, LA-67, LA-63, SANDOL LS-765, LS-292, LS-2626, LS-1114, LS-744, etc.

Photostabilizers can be included in the composition in an amount of from about 0 parts by mass to about 10 parts by mass, from about 0 parts by mass to about 5 parts by mass, or from about 0 parts by mass to about 3 parts by mass.

The composition optionally includes a filler (F). In one embodiment, the additive (F) is selected from a filler. Examples of suitable fillers include, but are not limited to, Silica, fumed Silica, $SiO_2$, $TiO_2$, MgO, ZnO, $CaCO_3$, $CeO_2$, $Fe_2O_3$, SiC, clay material, graphene oxide, boron oxide, boron nitride (BN), carbon nanotubes, zirconium oxide, Fly Ash, $Zr(OEt)_4$, $Ti(OEt)_4$, powder form of any polyimide, polybenzimidazole, polyamideimide, poly BPA sulfone, Siloxane-polyimide, Siloxane-benzimidazole, Siloxane-polysulfones or any other heat stable filler.

In one embodiment, the filler is present in an amount of from about 0 parts by mass to about 3000 parts, more preferably from about 15 parts to about 2000 parts, and most preferably from about 25 parts to about 30 parts based on the total weight of the curable silicone composition. In one embodiment, the filler can be present in an amount of from about 0 parts to about 50 parts, more preferably from about 10 parts to about 40 parts, and most preferably from about 25 parts to about 30 parts by weight based on the total weight of the curable silicone composition.

In one embodiment, the filler is present in an amount from about 20 parts by mass to about 30 parts based on the total weight of the curable silicone composition.

In one embodiment, the curable composition is free of any adhesion promoters. In another embodiment, the curable composition comprises an adhesion promoter.

According to one embodiment, the adhesion promoter is chosen from an alkoxy silanes such as aminoalkylalkoxy silanes, epoxyalkylalkoxy silanes, for example, 3-glycidoxypropyltrimethoxysilane and, mercapto-alkylalkoxy silanes and γ-aminopropyl triethoxysilane, reaction products of ethylenediamine with silylacrylates. Isocyanurates containing silicon groups such as 1,3,5-tris(trialkoxysilylalkyl) isocyanurates may additionally be used. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane, epoxyalkylalkoxy silane, mercaptoalkylalkoxy silane, derivatives thereof, or a combination of two or more thereof.

The silicone-imide base polymer (a) is present in an amount of from about 20 parts to about 100 parts, more preferably from about 40 weight % to about 95 weight %, and most preferably from about 50 weight % to about 91 weight % based on the total parts by weight of the curable silicone composition.

The crosslinker (b) is present in an amount of from about 0.5 parts to about 50 parts, more preferably from about 1 parts to about 30 parts, and most preferably from about 5 parts to about 10 parts based on the total parts by weight of the curable silicone composition.

The catalyst (c) can be present in an amount of from about 0.01 parts to about 5 parts, more preferably from about 0.2 parts to about 1 parts, and most preferably from about 0.01 parts to about 0.03 parts based on the total parts by weight of the curable silicone composition.

The filler can be present in an amount of from about 0 parts to about 50 parts, more preferably from about 10 parts to about 40 parts, and most preferably from about 25 parts to about 30 parts by weight based on the total weight of the curable silicone composition.

Condensation curable formulations cure in the presence of water, for example in the form of atmospheric moisture. When cured with water, the hydrolysis and condensation reactions described above occur between the organopolysiloxane and the crosslinker, which are optionally assisted by catalysts, with crosslinking to form siloxane bonds. The curing is therefore also referred to as networking. The present condensation curable formulations can be cured by applying the composition (either as a one-part composition or by mixing the components of a two-part composition) to a substrate of interest and exposing the composition to moisture sufficient to promote curing. Curing can be accomplished at room temperature (e.g., at temperatures of from about 20° C. to about 25° C.) or at elevated temperatures (e.g., above 25° C.).

In one embodiment, the silicone-imide composition can be coated or adhered on a substrate. The composition can be applied in any suitable manner including, but not limited to, brushing, spraying, curtain coating, dipping, spin coating, etc.

The substrate can be chosen from a plastic material, ceramic, glass, rubber material, filled metal, metal alloys, metallized plastic, and/or coated or painted metal. Examples of suitable plastics include, but are not limited to, synthetic organic polymeric materials, such as acrylic polymers, for example, poly(methylmethacrylate), and the like; polyesters, for example, poly(ethylene terephthalate), poly(butylene terephthalate), and the like; polyamides, polyimides, acrylonitrile-styrene copolymer, styrene-acrylonitrile-butadiene terpolymers, polyvinyl chloride, polyethylene, and the like, polycarbonates, and copolycarbonates such as EXL, high-heat polycarbonates. In one embodiment, the substrate is formed of polycarbonate or an acrylic resin. Polycarbonates are especially suitable materials for transparent substrates because of their excellent physical, mechanical and chemical properties. In general, the choice of substrate is ultimately determined by the contemplated end use.

The compositions may be used in a variety of applications. In embodiments, the compositions may be cured and used for properties like excellent thermal stability, thermal conductivity, dimensional stability, adhesion, mechanical properties, electrical properties, low temperature flexibility, low dielectric constant, thermo-oxidative stability, hydrophobicity, chemical resistance, biocompatibility, flame retardancy and gas permeability and are mainly used in the aerospace, electronics, automobiles, insulations, coatings, solvent resistant membranes applications etc.

The cured silicone-imide material formed from the composition can have a thermal degradation of 300° C. to 600° C., about 350° C. to about 550° C., or from about 400° C. to about 500° C. Thermal degradation, which may also be referred to as thermal decomposition, can be measured by thermogravimetric analysis (TGA). In one embodiment, thermal degradation can be measured using a TA TGA Q5000. Thermal degradation can be evaluated in a nitrogen or air atmosphere with a heating rate of 10° C./minute up to 1000° C. The compositions may be used in a variety of applications. In embodiments, the compositions may be cured and used for properties like excellent thermal stability, thermal conductivity, dimensional stability, adhesion, mechanical properties, electrical properties, low temperature flexibility, low dielectric constant, thermo-oxidative stability, hydrophobicity, chemical resistance, biocompatibility, flame retardancy and gas permeability and are mainly used in the aerospace, electronics, automobiles, insulations, coatings, solvent resistant membranes applications etc.

The silicone formulation comprises at least one hydroxy- or alkoxy-terminated organopolysiloxane. Such hydroxy- or alkoxy-terminated organopolysiloxane are condensation-crosslinkable. In addition, the hydroxy- or alkoxy-terminated organopolysiloxane may contain one or more branches. Preferably, however, are linear hydroxy or alkoxy-terminated organopolysiloxane. These organopolysiloxane are well known to those skilled in the art.

The silicone formulation may be a one-component or a two-part silicone formulation, as is conventional in the art. In particular, the silicone formulation according to the invention is a moisture-curing silicone formulation.

The following examples are intended to illustrate aspects and embodiments of the present technology. All parts and percentages are by weight and all temperatures are in Celsius unless explicitly stated otherwise. All patents, other publications, and U.S. patent applications referred to in the instant application are incorporated herein by reference in their entireties.

EXAMPLES

Compositions were prepared according to the examples listed in Table 1-2. The compositions were prepared by mixing the base polymer with crosslinker and condensation catalyst in a container. The mixture was mixed well manually as well as by using speed mixer.

The siloxane-imide base polymer is a Si-alkoxy terminated ABn siloxane-polyimide material falling under formula (I) synthesized from pyromellitic anhydride and allylamine followed by introduction of a Si—H moiety and reaction with a vinyltrimethoxysilane.

washed with water and methanol and dried using a high vacuum pump. Yield=65 g (95%). The material was characterized with 1H-NMR.

General Procedure for the Synthesis of Si-Alkoxy Terminated ABn Siloxane-Imide Base Polymer: N-Allyl terminated Pyromellitic diimide and Toluene (3× volume of total reactant) were taken in a 3-necked round bottom flask (Condenser/Thermometer/Dropping Funnel) under inert atmosphere and heated at 75° C. until the time the mixture becomes a clear solution. Pt catalyst (15 ppm) was added followed by drop wise addition of $M^H D_n M^H$ (the amount to be calculated based on the targeted n in ABn). The reaction was monitored by 1H-NMR and after completion of the reaction (absent of allyl peak) the vinyltrimethoxysilane (0.02 eqv) was added dropwise via a dropping funnel. On completion of the reaction (disappearance of hydride peak in 1H-NMR), the reaction was quenched by charcoal. The product was obtained by removing Toluene by rotavapor from filtrate. The product was obtained as liquid with yield of about >80%. The material was characterized with 1H-NMR.

(Formula I)

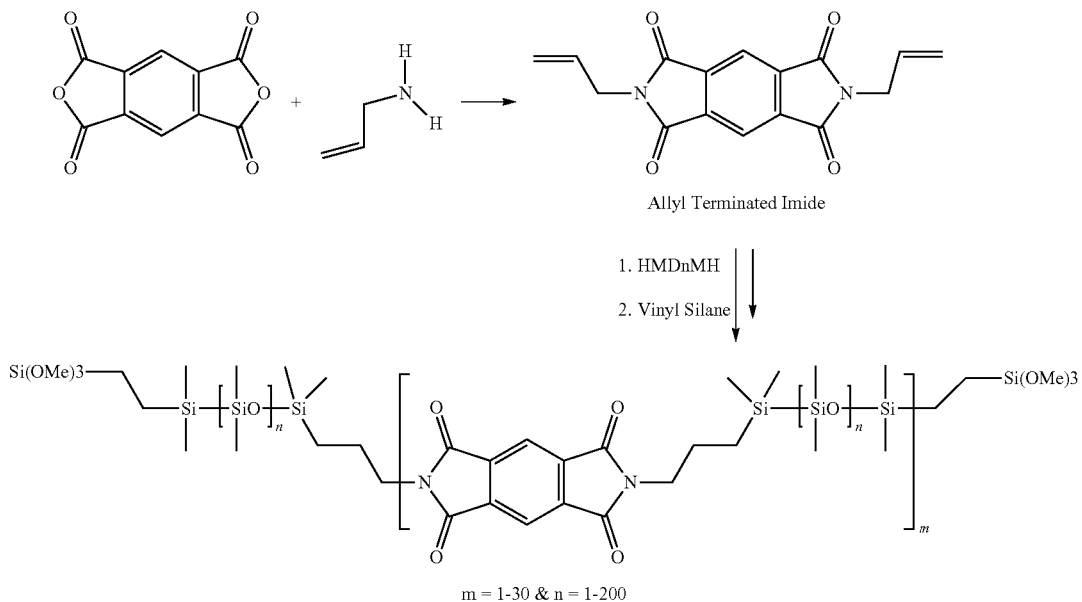

m = 1-30 & n = 1-200

Synthesis of N-Allylamide of Pyromellitic Dianhydride: Pyromellitic dianhydride (50 g, 0.2292 mol) and Acetic Acid (250 ml) were taken in a 3-necked round bottom flask (Condenser/Overhead Stirrer/Dropping Funnel) followed by addition of Allylamine (28 g, 0.504 mol) drop wise at ice cold condition. Once addition completes, applied heat started from 40° C. to 130° C. until the reaction mixture becomes a clear solution. There was a change in the color over a period of time. Once the solution is clear, heat is applied at 130° C. for 4 hours to form the ring. In another round bottom, 250 ml of water was taken and heated at about 100° C. Then the reaction mixture was poured into the water slowly and it formed a solid material. The solid material was filtered off using a funnel with paper. The solid material was The crosslinker is selected from an alkoxysilicate or an alkoxysilane.

The condensation curable silicone-imide base polymer used in the examples may differ in concentration of low volatiles or smaller cyclic.

The compositions were poured into a Teflon mold having dimensions of 145 mm$^2$×0.15 mm and kept at room temperature for 24 hours for full curing.

Heat stability: Thermal degradation was investigated by using the TGA instrument TA TGA Q5000 in a nitrogen or air atmosphere with a heating rate of 10° C./min till 1000° C.

TABLE 1

|  |  |  | 1 | 2 | 3 | 4 | 5 | 6 |
|---|---|---|---|---|---|---|---|---|
| Silicone-Imide | A-1 | m = 1, n = 11 | 90.9 | 58 |  |  |  |  |
|  | A-2 | m = 1, n = 25 |  |  | 90.9 | 58 |  |  |
|  | A-3 | m = 1, n = 100 |  |  |  |  | 90.9 | 58 |
| Crosslinker | B-1 | Methyltrimethoxysilane (MTMS) | 9 | 5.8 | 9 | 5.8 | 9 | 5.8 |
|  | B-2 | Tetraethoxy silicate | 0 | 0 | 0 | 0 |  |  |
| Catalyst | C-1 | Tin catalyst | 0.025 | 0.025 | 0.025 | 0.025 | 0.025 | 0.025 |
| Filler | D-1 | Iron oxide (<40%) |  | 36 |  | 36 |  | 36 |
| Heat stability |  | Total (%) | ~100 | ~100 | ~100 | ~100 | ~100 | ~100 |
|  |  | TGA $T_d$(° C.) In air | 494 | 539 | 488 | 549 | 461 | 457 |
|  |  | TGA $T_d$(° C.) In nitrogen | 489 | 542 | 490 | 543 | 510 | 552 |

TABLE 2

|  |  |  | C-1 | C-2 |
|---|---|---|---|---|
| Hydroxy terminated organopolysiloxane | A-1 | $M^{OH}DD^{Ph}M^{OH}$ | 90.9 | 60.66 |
| Crosslinker | B-1 | Methyltrimethoxysilane (MTMS) | 0 | 0 |
|  | B-2 | Tetraethoxy silicate | 9 | 6.66 |
| Catalyst | C-1 | Tin catalyst | 0.025 | 0.025 |
| Filler | D-1 | Iron oxide (<40%) |  | 26.66 |
| Heat stability |  | Total | 100 | 100 |
|  |  | TGA $T_d$(° C.) In air | 503 | 486 |
|  |  | TGA $T_d$(° C.) In nitrogen | 512 | 487 |

As illustrated in the Table 1 and Table 2, the present condensation curable adhesive compositions comprising siloxane-imide as base polymer provide good heat stability compared to the use of known base polymers.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of an aromatic-containing silicone compound and curable compositions comprising such compounds. Modifications may occur to those skilled in the art and to those who may make and use the invention. The disclosed embodiments are merely for illustrative purposes and not intended to limit the scope of the invention or the subject matter set forth in the claims.

What is claimed is:

1. A condensation curable composition comprising: (a) a silicone-imide base polymer; (b) a crosslinker; (c) a condensation cure catalyst; and (d) optionally, an additive, wherein the silicone-imide polymer (a) is selected from a compound of the formula (I):

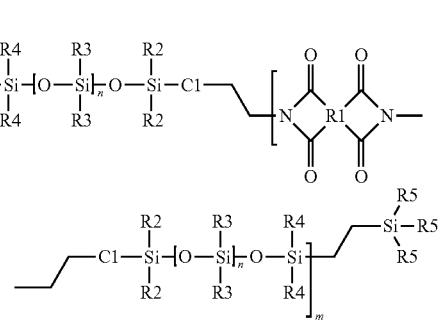

(I)

wherein $R^1$ is chosen from a C5-C20 aryl or a polycyclic aryl group comprising two or more C5-C20 aryl groups, where $R^1$ is optionally unsubstituted or substituted with a C1-C6 alkyl, a halogen, a haloalkyl, a hydroxy, and/or a C1-C5 alkoxy groups;

$C^1$ can be chosen from C1 to C5 alkyl, a C5-C20 aryl, a C7-C16 arylalkyl, or a C7-C16 alkylaryl;

$R^2$, $R^3$, and $R^4$ may be same or different from one another, and are selected from a C1-C3 alkyl or phenyl;

$R^5$ may be same or different and can be chosen from C1-C30 alkyl, a C1-C30 alkoxy group, a C1-C30 acetoxy group, or a C1-C30 ketoxime group;

m is an integer between 1 and 30; and n is an integer between 1 and 200.

2. The curable silicone composition of claim 1, wherein $R^1$ is selected from benzene, naphthalene, benzophenone, biphenyl, a biphenyl alkane, biphenylether, isopropylidinediphenylphenoxy, biphenyl sulfone, biphenyl sulfide, norbornyl and hexafluoromethylbiphenyl.

3. The curable composition of claim 1, wherein $R^1$ is benzene.

4. The curable composition of claim 1, comprising the silicone-imide base polymer (a) in an amount of from about 40 weight % to about 95 weight % based on the total parts by weight of the curable silicone composition.

5. The curable composition of claim 1, wherein the silicone-imide base polymer (a) is present in an amount of from about 50 weight % to about 91 weight % based on the total parts by weight of the curable silicone composition.

6. The curable silicone composition of claim 1, wherein the crosslinker (b) is selected from an alkoxysilane, an alkoxysilicate, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkarylaminosiloxane, an alkoxycarbamatosilane, an alkoxycarbamatosiloxane, or a combination of two or more thereof.

7. The curable composition of claim 6, wherein the crosslinker (b) is selected from tetraethylorthosilicate (TEOS), methyltrimethoxysilane (MTMS), or a combination thereof.

8. The curable composition of claim 1, comprising the crosslinker (b) in an amount of from about 0.5 parts to about 50 parts based on the total parts by weight of the curable silicone composition.

9. The curable composition of claim 1, comprising the crosslinker (b) in an amount of from about 5 parts to about 10 parts based on the total parts by weight of the curable silicone composition.

10. The curable silicone composition of claim 1, wherein the catalyst (c) is selected from (i) a metal or organometal catalyst comprising a metal selected from Ca, Ce, Bi, Fe, Mo, Mn, Pb, Ti, V, Zn, Sn, and Y, or (ii) a non-tin catalyst comprising a carboxylic acid component, an amino containing silane, and optionally an amino containing siloxane component.

11. The curable silicone composition of claim 10, wherein the organometal catalyst is dibutyltin dilaurate.

12. The curable composition of claim 1, comprising the catalyst (c) in an amount of from about 0.01 parts to about 5 parts based on the total parts by weight of the curable silicone composition.

13. The curable composition of claim 1, wherein the additive (d) is selected from a filler, a pigment, a lubricant, a viscosity modifier, an antioxidant, a photostabilizer, a heat stabilizer, a flame retardant, an inhibitor, an adhesion promoter, or a combination of two or more thereof.

14. The curable composition of claim 13, wherein the additive (d) is a filler selected from $SiO_2$, $TiO_2$, MgO, ZnO, $CaCO_3$, $CeO_2$, $Fe_2O_3$, SiC, Clay Material, Graphene Oxide, Boron Oxide, BN, Carbon Nano Tube, Zirconium Oxide, Fly Ash, $Zr(OEt)_4$, $Ti(OEt)_4$, a powder form of any Polyimide, Polybenzimidazole, Polyamideimide, Poly BPA Sulfone, Siloxane-Polyimide, Siloxane-Benzimidazole, Siloxane-Polysulfones, a combination of two or more thereof.

15. The curable composition of claim 14, wherein the filler is $Fe_2O_3$.

16. The curable composition of claim 14, comprising the filler in an amount of from about 0 parts to about 50 parts by weight based on the total weight of the curable composition.

17. The curable composition of claim 14, comprising the filler in an amount of from about 10 parts to about 40 parts by weight based on the total weight of the curable silicone composition.

18. A cured silicone-imide material formed from the composition of claim 1.

19. The cured silicone-imide material of claim 18 having a thermal degradation of 400° C. to 600° C. as measured by thermogravimetric analysis.

20. The cured material of claim 18, wherein the cured silicone-imide material is employed on or as part of an article in an aerospace device, an electronic device, an electronic component, an automobile, insulation, a coating, or a solvent resistant membranes.

21. An article comprising a substrate, wherein the silicone-imide composition of claim 1 is coated or adhered on a surface of the substrate.

22. The article of claim 21, wherein the substrate comprises a material selected from a plastic material, a ceramic, a glass, a rubber material, a filled metal, a metal alloy, a metallized plastic, a coated or painted metal, or a combination of two or more thereof.

23. The article of claim 21, wherein the substrate material is selected from an acrylic polymer, a polyester, a polyamide, a polyimide, an acrylonitrile-styrene copolymer, a styrene-acrylonitrile-butadiene terpolymer, polyvinyl chloride, polyethylene, polycarbonate, a copolycarbonate, or a combination of two or more thereof.

* * * * *